United States Patent [19]

Amano et al.

[11] Patent Number: 5,342,906

[45] Date of Patent: Aug. 30, 1994

[54] METHOD FOR THE SUSPENSION POLYMERIZATION OF VINYL CHLORIDE MONOMER

[75] Inventors: Tadashi Amano; Toshimichi Koga, both of Ibaraki, Japan

[73] Assignee: Shin-Etsu Chemical Co., Ltd., Tokyo, Japan

[21] Appl. No.: 60,596

[22] Filed: May 11, 1993

Related U.S. Application Data

[63] Continuation-in-part of Ser. No. 861,527, Apr. 1, 1992, abandoned.

[51] Int. Cl.5 .......................... C08F 2/20; C08F 2/18
[52] U.S. Cl. ........................... 526/88; 526/202; 526/344.2
[58] Field of Search ............... 526/329.4, 330, 88

[56] References Cited

U.S. PATENT DOCUMENTS

| | | | |
|---|---|---|---|
| 3,544,539 | 12/1970 | Koyanagi . | |
| 4,732,953 | 3/1988 | Carroll, Jr. | 526/88 |
| 4,833,180 | 5/1989 | Brulet | 523/322 |
| 5,047,488 | 9/1991 | Nogues | 526/65 |
| 5,089,575 | 2/1992 | Arima | 526/200 |

FOREIGN PATENT DOCUMENTS

| | | |
|---|---|---|
| 0072544 | 2/1983 | European Pat. Off. . |
| 0254615 | 1/1988 | European Pat. Off. . |
| 2029247 | 10/1970 | France . |
| 2085047 | 12/1971 | France . |
| 1393678 | 5/1975 | United Kingdom . |

*Primary Examiner*—Christopher Henderson
*Attorney, Agent, or Firm*—McAulay Fisher Nissen Goldberg & Kiel

[57] ABSTRACT

An improved method is proposed for the suspension polymerization of vinyl chloride monomer in an aqueous medium, by which the polyvinyl chloride resin obtained may have an increased bulk density without causing any disadvantages. The improvement can be obtained by controlling the power on the stirrer for the agitation of the polymerization mixture in such a manner that the power at the moment of the start of the polymerization reaction is 100 to 200 kgf.m/s per 1000 kg of the polymerization mixture and the power is subsequently decreased either continuously or step-wise according to a specified schedule down to 60 to 90% of the value at the start of the polymerization reaction at the moment when conversion of the monomer to polymer is 30% along with starting of the operation of the reflux condenser at a specified moment in relation to the stirrer power and the monomer conversion.

1 Claim, 1 Drawing Sheet

METHOD FOR THE SUSPENSION POLYMERIZATION OF VINYL CHLORIDE MONOMER

This is a continuation-in-part application from a copending U.S. patent application Ser. No. 07/861,527 filed Apr. 1, 1992 now abandoned.

BACKGROUND OF THE INVENTION

The present invention relates to an improvement in the suspension polymerization of vinyl chloride. More particularly, the invention relates to an improvement in the method for the suspension polymerization of vinyl chloride to prepare a polyvinyl chloride resin having a relatively high bulk density and containing a remarkably decreased amount of fish eyes, in which the amount of polymer scale built-up on the reactor walls can be greatly decreased and the unreacted vinyl chloride monomer absorbed in the resin particles can be readily released to cause little problem of environmental pollution which badly affects the workers' health.

As is well known, polyvinyl chloride resins in general are industrially very important in respect of their excellent properties and relative inexpensiveness as a base resin of molding compositions for both of plasticized or flexible shaped articles and unplasticized or rigid shaped articles which are fabricated by various molding methods including calendering, extrusion molding, injection molding and the like. One of the important requirements for a polyvinyl chloride resin in the form of a powder is that the bulk density of the resin powder is as high as possible in order to save the volume capacity of the molding machine. This requirement is particularly important inter alia in the extrusion molding of unplasticized or rigid shaped articles of polyvinyl chloride resins.

Polyvinyl chloride resins are mostly prepared by the suspension polymerization of vinyl chloride monomer or a monomer mixture mainly composed of vinyl chloride in an aqueous polymerization medium containing a dispersing agent dissolved or dispersed therein by agitation with a stirrer in the presence of a monomer-soluble polymerization initiator. Various attempts and proposals have been heretofore made with an object to obtain a polyvinyl chloride resin powder having an increased bulk density for the above mentioned reason including a method disclosed in Japanese Patent Kokai No. 59-168008 in which a portion of the monomer is retained and introduced into the polymerization mixture in the course of the polymerization reaction under proceeding, a method disclosed in Japanese Patent Kokai No. 57-7600 in which a specific polyvinyl alcohol of high degree of saponification is used as the water-soluble dispersing agent and so on.

These prior art methods are indeed not ineffective to give a polyvinyl chloride resin powder having a considerably increased bulk density. The polyvinyl chloride resin powder obtained by these prior art methods, however, is defective in respect of the low porosity of the particles and a relatively large amount of fish eyes contained therein. When the porosity of the resin particles is low, the unreacted vinyl chloride monomer absorbed in the resin particles is released only at a low velocity so that the content of the unreacted monomer in the resin product is necessarily high to cause a serious problem due to the toxicity of the vinyl chloride monomer such as pollution of the working environment in the processing of the resin product after the polymerization reaction and the molding process of the resin composition as well as a limitation in the application of the shaped articles of the resin composition.

Besides the above mentioned polyvinyl alcohol of a high degree of saponification, extensive tests have heretofore been undertaken for the performance of various types of polyvinyl alcohols as a dispersing agent used in the suspension polymerization of vinyl chloride including those insoluble in water but soluble in the monomer having a low degree of polymerization and low degree of saponification and those having various kinds of modifying groups available as a result of the progress in the preparation method of polyvinyl alcohols although the improvements obtained by using these specific polyvinyl alcohols can be far from satisfactory. For example, the monomer-soluble polyvinyl alcohol has a problem that the polyvinyl chloride resin powder obtained therewith has a rather decreased bulk density although some improvements can be obtained in the monomer releasability of the particles and the content of fish eyes in the resin powder. Modified polyvinyl alcohols are also defective because, when suspension polymerization of vinyl chloride is conducted by using such a dispersing agent, the amount of polymer scale deposition on the reactor walls is relatively large in addition to the problem of the poor uniformity in the particle size distribution of the resin powder due to the poor stability of the monomer suspension in the aqueous suspension medium.

SUMMARY OF THE INVENTION

The present invention accordingly has an object to provide a novel and improved method for the suspension polymerization of vinyl chloride monomer to give a polyvinyl chloride resin having improved properties, particularly, in respect of the bulk density of the powder, releasability of the absorbed monomer in the resin particles and content of fish eyes therein still without increasing the amount of polymer scale deposition on the reactor walls.

Thus, the present invention provides an improvement, in the suspension polymerization of vinyl chloride or a monomer mixture mainly composed of vinyl chloride in an aqueous medium containing a dispersing agent in the presence of a monomer-soluble polymerization initiator comprising the steps of introducing from 110 to 200 parts by weight of water and from 0.02 to 0.15 part by weight of a dispersing agent, which is a partially saponified polyvinyl alcohol having a degree of saponification of 60 to 80% and an average degree of polymerization of 500 to 1000 to give a 4% by weight aqueous solution having a viscosity not exceeding 15 centipoise at 20° C. and a 1% by weight aqueous solution having an absorbance of light of at least 4 at a wavelength of 280 nm for an optical path length of 1 cm, into a polymerization reactor equipped with a stirrer and a reflux condenser to form a polymerization medium, deaerating the polymerization medium by reducing the pressure, introducing 100 parts by weight of the vinyl chloride monomer or monomer mixture, introducing the polymerization initiator into the polymerization medium under agitation with the stirrer to form a polymerization mixture, increasing the temperature of the polymerization mixture to a polymerization temperature to start the polymerization reaction under continuous agitation of the polymerization mixture with the stirrer driven with a power sufficient to suspend the monomer droplets in the polymerization medium and continuing agitation of the polymerization mixture until the end of the polymerization reaction, which comprises:

(a) driving the stirrer with a power thereon in the range from 100 to 200 kgf.m/s per 1000 kg of the polymerization mixture at least until the start of the polymerization reaction;

(b) decreasing the power on the stirrer either stepwise or continuously during the period from the start of the polymerization reaction to the moment when conversion of the monomer or monomer mixture into polymer is 17% down to a value in the range from 96 to 84% of the value before the start of the polymerization reaction;

(c) bringing the reflux condenser into operation at a moment when conversion of the monomer or monomer mixture into polymer is in the range from 5 to 20%, after the moment when conversion of the monomer or monomer mixture into polymer is higher by at least 3% than the conversion at the moment when the power on the stirrer is decreased in step (b) and the power on the stirrer is in the range from 96 to 80% of the power before the start of the polymerization reaction; and (d) further decreasing the power on the stirrer either step-wise or continuously during the period from the start of the operation of the reflux condenser to the moment when the conversion of the monomer or monomer mixture is 30% by a decrement in the range from 4 to 20% based on the power at the start of the polymerization reaction so that the power on the stirrer is in the range from 90 to 60% based on the power before the start of the polymerization reaction.

BRIEF DESCRIPTION OF THE DRAWING

The FIGURE is a graph showing the schedule of power control on the stirrer as a function of the % monomer conversion into polymer in each of the Examples and Comparative Examples.

DETAILED DESCRIPTION OF THE PREFERRED EMBODIMENTS

Figure 1:
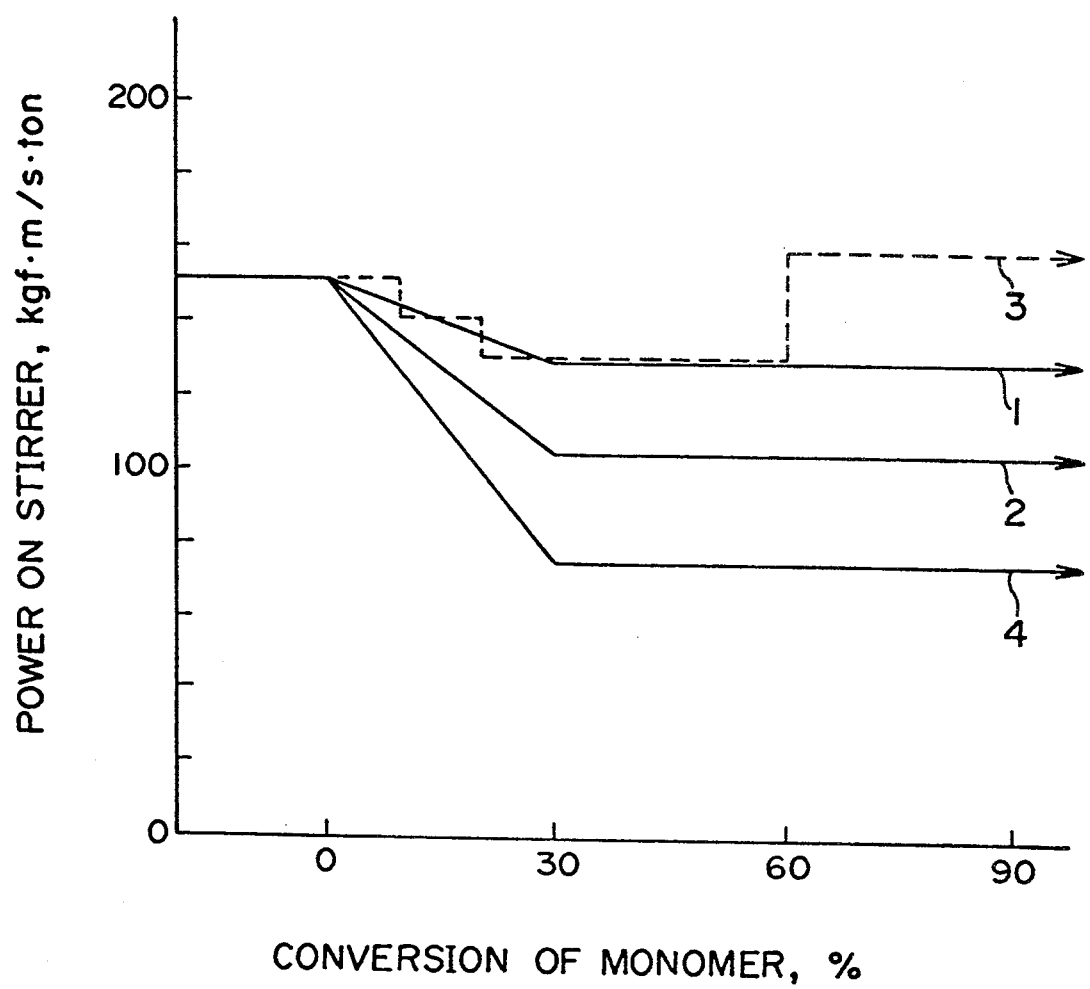

As is described above, the most characteristic feature of the improvement provided by the invention consists in the step-wise or continuous decreasing control of the power on the stirrer for agitation of the polymerization mixture at particularly specified stages. Otherwise, the conditions for the suspension polymerization of vinyl chloride monomer or monomer mixture are rather conventional.

In the first stage for practicing the suspension polymerization, a polymerization reactor equipped with a stirrer and a reflux condenser is charged with deionized water and a water-soluble dispersing agent. It is a preferable procedure that the deionized water introduced into the polymerization reactor is already at an elevated temperature of 40° to 50° C. by heating beforehand so that an advantage is obtained in the increased efficiency of the reactor utilization owing to the decrease in the length of time taken for completing a polymerization run including the time taken for heating the aqueous medium up to the polymerization temperature which is usually in the range from 50° to 60° C.

The type of the dispersing agent can be conventional and selected from known ones used in the suspension polymerization of vinyl chloride. Examples of suitable dispersing agents include water-soluble polymers such as partially saponified polyvinyl alcohols, water-soluble non-ionic cellulose ethers, e.g., methyl cellulose, ethyl cellulose, hydroxyethyl cellulose, hydroxypropyl cellulose and hydroxypropyl methyl cellulose, sodium salt of polyacrylic acid, naturally occurring water-soluble polymers, e.g., gelatin, and so on. These water-soluble polymers can be used, if desired, in combination with a monomer-soluble low-saponification polyvinyl alcohol or surface active agent such as sorbitan monolaurate, sorbitan trioleate, sorbitan monostearate, glycerin tristearate and ethylene oxide-propylene oxide block copolymers, water-soluble surface active agent such as polyoxyethylene sorbitan monolaurate, polyoxyethylene glycerin oleate, sodium laurate and sodium dodecylbenzene sulfonate, and inorganic fine powders of, for example, calcium carbonate and calcium phosphate.

It is, however, preferable that at least a substantial portion of the dispersing agent is a specific partially saponified polyvinyl alcohol which is characterized by a degree of saponification in the range from 60 to 80%, an average degree of polymerization in the range from 500 to 1000 and an absorbance of a 1% by weight aqueous solution of at least 4 in an optical path length of 1 cm for light having a wavelength of 280 nm. Such a partially saponified polyvinyl alcohol usually gives a 4% by weight aqueous solution having a viscosity not exceeding 15 centipoise at 20° C. The improvement provided by the present invention would be more remarkable when this specific dispersing agent is used in an amount in the range from 0.02 to 0.15% by weight or, preferably, from 0.03 to 0.08% by weight based on the amount of the monomer or monomer mixture. When the dispersing agent is a combination of this specific partially saponified polyvinyl alcohol and one or more of other dispersing agents, it is preferable that the amount of the former is at least 60% by weight of the total amount of the combined dispersing agents.

The dispersing agent or agents can be introduced into the polymerization reactor either as such separately from the deionized water or as a solution or dispersion in water or other suitable solvent prepared beforehand. The thus prepared aqueous medium in the polymerization reactor is then deaerated by reducing the pressure inside the reactor down to a pressure of, for example, 50 mmHg by using a pumping means. This procedure is conventional without particular limitations.

In the next place, vinyl chloride monomer or a monomer mixture mainly composed of vinyl chloride or, namely, a mixture of vinyl chloride and a minor amount of one or more of other ethylenically unsaturated monomers copolymerizable with vinyl chloride is introduced into the reactor. The comonomer copolymerizable with vinyl chloride is exemplified by vinyl esters such as vinyl acetate and vinyl propionate, alkyl esters of acrylic and methacrylic acids such as methyl acrylate, ethyl acrylate and methyl methacrylate, olefins such as ethylene and propylene, vinyl ethers such as lauryl vinyl ether and isobutyl vinyl ether, maleic anhydride, acrylonitrile, styrene, vinylidene chloride and the like. The stirrer of the polymerization reactor is driven so as to disperse the monomer or monomers into the aqueous medium forming a suspension thereof in the aqueous medium.

When a suspension of the monomer or monomers is established in the aqueous medium, a monomer-soluble polymerization initiator is added to the mixture in the reactor. Although it is sometimes practiced to use a monomer-soluble polymerization initiator in combination with a water-soluble polymerization initiator such as potassium persulfate, ammonium persulfate, hydrogen peroxide and cumene hydroperoxide, the advantages of the present invention can be obtained by using a monomer-soluble initiator alone. The monomer-soluble polymerization initiator can be selected from those conventionally used in the suspension polymerization of vinyl chloride including percarbonate compounds such as diisopropylperoxy dicarbonate, di-2-ethylhexylperoxy dicarbonate and diethoxyethylperoxy percarbonate, perester compounds such as tert-butylperoxy neodecanoate, tert-butylperoxy pivalate, tert-hexylperoxy pivalate, α-cumylperoxy neodecanoate and 2,4,4-trimethylpentyl-2-peroxy 2-neodecanoate, organic peroxides such as acetyl cyclohexylsulfonyl peroxide, 2,4,4-trimethylpentyl-2-peroxy phenoxyacetate, 3,5,5-trimethylhexanoyl peroxide and lauroyl peroxide and azo compounds such as azobis-2,4-dimethyl valeronitrile and azobis(4-methoxy-2,4-dimethyl valeronitrile). These monomer-soluble polymerization initiators can be used as a combination of two kinds or more according to need. It should be noted that the present invention is applicable only to the polymerization reaction in which the polymerization initiator is a monomer-soluble initiators described above and is not applicable when a water-soluble polymerization initiator such as potassium persulfate is used either alone or in a substantial amount in combination with a monomer-soluble initiator as is sometimes the case in the polymerization procedure of vinyl chloride.

The amount of the polymerization initiator added to the polymerization mixture is usually in the range from 0.03 to 0.20 part by weight per 100 parts by weight of the monomer or monomers. It is a conventional procedure that the monomer-soluble polymerization initiator is introduced into the polymerization reactor in the form of a solution in an organic solvent or in the form of an aqueous emulsion prepared beforehand while the stirrer of the polymerization reactor is continuously driven so that the polymerization initiator is readily dispersed and dissolved in the droplets of the monomer or monomer mixture to complete the polymerization mixture in the reactor.

The thus completed polymerization mixture is then heated up to the polymerization temperature, which is usually in the range from 50° to 60° C., to start the polymerization reaction. The time taken for this temperature elevation naturally depends on the heating capacity of the polymerization reactor by passing hot water or steam through the jacket of the reactor. The time taken for the temperature elevation, however, is usually very short provided that the deionized water introduced at the first is preheated to a temperature of 40° to 50° C. The polymerization temperature is maintained until termination of the polymerization reaction.

It is essential according to the present invention that the power on the stirrer under driving is in the range from 100 to 200 kgf.m/s or, preferably, from 120 to 170 kgf.m/s per 1000 kg of the polymerization mixture in the reactor at least at or before the moment when the temperature of the polymerization mixture reaches the polymerization temperature so as to start the polymerization reaction. The power on the stirrer here implied represents the energy added per unit time to the polymerization mixture in the reactor under agitation and can be determined from the revolution of the stirrer shaft and the torque on the stirrer shaft which in turn can be determined by means of a torquemeter attached to the shaft.

The most characteristic feature according to the present invention is that the power on the stirrer agitating the polymerization mixture in the reactor is, subsequent to the start of the polymerization reaction, decreased either continuously or step-wise according to a specific schedule. In the first stage of the decreasing control of the power, the power on the stirrer is decreased to a value in the range from 84 to 96% of the power before the start of the polymerization reaction, referred to as the initial power hereinafter. This decreasing action of the power on the stirrer must be undertaken at or before the moment when conversion of the monomer or monomer mixture into polymer has reached 17%.

According to the invention, the reflux condenser is brought into operation only after the first stage decrease of the power on the stirrer although it is essential that the operation of the reflux condenser is started at a moment when conversion of the monomer or monomer mixture into polymer is within a range from 5 to 20%. Another essential requirement relative to the start of the operation of the reflux condenser is that the conversion of the monomer or monomer mixture at the moment of the start of the condenser operation is larger by at least 3% than the conversion at the moment when the power on the stirrer is decreased following the start of the polymerization reaction into 96 to 84% of the initial power. When the power decrease on the stirrer is effected at the same time as the start of the polymerization reaction, for example, the reflux condenser is brought into operation only after the monomer conversion has reached 5% while, when the power decrease on the stirrer is effected at the moment when the monomer conversion is 17%, the reflux condenser must be brought into operation just as the monomer conversion has reached 20%. When the above mentioned requirements are not satisfied, the resin product obtained would be unsatisfactory in the particulate conditions with a broadened particle size distribution and a decrease in the bulk density. A further requirement relative to the moment when the reflux condenser is brought into operation is that the power on the stirrer is still in the range from 96 to 80% of the initial power. This requirement means that the rate of power decreasing according to step (b) should not be too great.

Subsequent to or at the same time as the start of operation of the reflux condenser, the power on the stirrer is decreased again either step-wise or continuously before the monomer conversion reaches 30%. The decrement in the power on the stirrer in this second-stage decrease, i.e. the difference between the powers after the first and the second times of decrease, is in the range from 4 to 20% based on the power before the start of the polymerization reaction, i.e. the initial power. The power on the stirrer after this second-stage decrease should be within the range from 60% to 90% or, preferably, from 70% to 90% of the initial power at the moment when the monomer conversion is 30%.

The thus decreased stirrer power can be maintained until termination of the polymerization reaction although the power on the stirrer is not particularly limitative after the moment of 30% monomer conversion. The stirrer power should not be too small in respect of removal of the heat of polymerization and prevention of polymer scale deposition on the reactor walls. It is sometimes necessary to increase the stirrer power to exceed the initial power at the latest stage of the polymerization reaction with the monomer conversion exceeding 60 to 70% when a trouble is foreseen due to violent foaming of the polymerizate slurry to cause carry-over of the foams into the reflux condenser. The type of the stirrer for agitation of the polymerization mixture is not particularly limitative including conventional ones such as paddle stirrers, Pfaudler stirrers, Bullmargin stirrers, propeller stirrers, turbine-blade stirrers and the like.

It is optional according to need that the polymerization mixture is admixed with various kinds of known additives conventionally used in the suspension polymerization of vinyl chloride including polymerization regulators, chain transfer agents, pH controlling agents, gelation improvers, antistatic agents, crosslinking agents, stabilizers, fillers, antioxidants, buffering agents, scale-deposition inhibitors and the like each in a limited amount.

The polymerizate slurry produced in the above described manner is processed according to a conventional procedure to give a polyvinyl chloride resin product in the form of a powder.

In the following, the improvement according to the present invention is illustrated in more detail by way of examples and comparative examples, in which the polyvinyl chloride resin powders obtained were evaluated relative to the items and in the testing procedures described below.

Bulk density
 Determination was made according to the procedure specified in JIS K 6721 recording the value in g/cm$^3$.

Particle size distribution
 Determination was made according to the procedure specified in JIS Z 8801 using three screens having mesh openings of 60 meshes, 100 meshes and 200 meshes to record the amounts of the powder passing through the respective screens in % by weight.

Plasticizer absorption
 A 10 g portion of the resin powder was put into a cyclindrical vessel of an aluminum alloy having an inner diameter of 25 mm and a depth of 85 mm and holding a mass of glass fibers on the bottom, to which 15 ml of dioctyl phthalate as a plasticizer were added and kept standing for 30 minutes at room temperature to cause absorption of the plasticizer by the resin particles followed by centrifugation to remove the unabsorbed plasticizer recording the amount of the absorbed plasticizer in % by weight based on the amount of the resin powder.

Fish eyes
 A mixture consisting of 100 parts by weight of the resin powder, 50 parts by weight of dioctyl phthalate, 0.1 part by weight of barium stearate, 0.1 part by weight of cadmium stearate, 0.8 part by weight of cetyl alcohol, 2.0 parts by weight of a tin-containing stabilizer, 0.5 part by weight of titanium dioxide and 0.1 part by weight of carbon black was milled for 5 minutes on a 6-inch test roller mill at 140° C. into a resin composition from which a sheet of 0.3 mm thickness was prepared by sheeting and visually inspected to count the number of translucent spots as the fish eyes in a 100 cm$^2$ wide area.

Residual monomer content
 The resin powder was dissolved in tetrahydrofuran and the solution was analyzed by the gas chromatography for the content of vinyl chloride monomer to record the results in ppm by weight based on the amount of the resin powder.

Polymer scale deposition
 The reactor walls after discharge of the polymerizate slurry was visually inspected to record the surface condition in three ratings according to the following criteria.
 A: metallic luster retained without scale deposition
 B: slight dullness in the metallic luster of the surface
 C: surfaces coated all over with a thin film of polymer Examples 1 to 4 and Comparative Examples 1 and 2

In each of these Examples and Comparative Examples, a stainless steel-made, jacketed polymerization reactor having a capacity of 2100 liters and equipped with a stirrer with three-stage paddle blades and a multitubular reflux condenser having a heat-transfer area of 7.6 m$^2$ was charged with 890 kg of deionized water pre-heated at 46° C. and 933 g (Examples 1, 3 and 4 and Comparative Examples 1 and 2) or 1400 g (Example 2) of a 30% by weight aqueous solution of a partially saponified polyvinyl alcohol, referred to as the PVA hereinbelow, to form a mixture. The PVA had a degree of saponification of 72.4% and average degree of polymerization of 770 giving a 4% by weight aqueous solution having a viscosity of 5.7 centipoise at 20° C. and a 1% by weight aqueous solution having an absorbance of light of 280 nm wavelength of 6.5 for a 1 cm optical path length. The amount of the PVA was 0.04% by weight in Examples 1, 3 and 4 and Comparative Examples 1 and 2 and 0.06% by weight in Example 2 based on the amount of the vinyl chloride monomer subsequently introduced as mentioned below.

After evacuation of the reactor down to a reduced pressure of 50 mmHg, 700 kg of vinyl chloride monomer were introduced thereinto and the stirrer was started to agitate the mixture in the reactor with a power thereon of 152 kgf.m/s (Examples 1, 2 and 4 and Comparative Examples 1 and 2) or 130 kgf.m/s (Example 3) per 1000 kg of the mixture in the reactor to disperse the monomer in the aqueous medium. After 3 minutes of agitation, 735 g of an aqueous emulsion containing 40% by weight of di-2-ethylhexylperoxy dicarbonate were introduced by pressurization into the mixture in the reactor to form a polymerization mixture under continued agitation along with start of heating of the polymerization mixture to the polymerization temperature of 57° C. so that the polymerization reaction was started. This polymerization temperature was maintained until termination of the polymerization reaction.

Subsequent to the start of the polymerization reaction, the power on the stirrer was modified as described below in each of the Examples and Comparative Examples excepting Comparative Example 1 in which the stirrer power was constant throughout the polymerization reaction. Thus, the stirrer power was continuously decreased at a constant rate in Examples 1 to 3 and Comparative Example 2 until the moment when the conversion of the monomer into polymer was 30%, from 152 down to 130 kgf.m/s in Examples 1 and 2, from 130 down to 105 kgf.m/s in Example 3, from 152 down to 75 kgf.m/s in Comparative Example 2, each per 1000 kg of the mixture in the reactor, to keep these decreased stirrer powers thereafter until termination of the polymerization reaction. In Example 4, the stirrer power was changed in three steps firstly down to 140 kgf.m/s, secondly down to 130 kgf.m/s and thirdly up to 160 kgf.m/s at the moments when the conversion of the monomer to polymer was 10%, 20% and 60%, respectively, subsequently to keep this stirrer power until the end of the polymerization reaction. The FIGURE of the accompanying drawing is a graph showing the schedules of the stirrer power control as a function of the monomer conversion by the curve 1 for Examples 1 and 2, curve 2 for Example 3, curve 3 for Example 4 and curve 4 for Comparative Example 2. The power on the stirrer in Examples 1 to 4 and Comparative Examples 1 and 2 was 86%, 86%, 81%, 86%, 100% and 49%, respectively based on the initial power at the moment when the monomer conversion was 30%.

In each of these experiments, the reflux condenser to the reactor was brought into operation at a moment when the monomer conversion was 15%. The power on the stirrer at this moment was 93%, 93%, 90%, 92% and 75% in Examples 1 to 4 and Comparative Example 2, respectively.

The polymerization reaction was continued at 57° C. under the above described conditions of agitation and, when the pressure inside the reactor had dropped to 6.0 kg/cm²G, the unreacted vinyl chloride monomer was purged to terminate the polymerization reaction. The polymerizate slurry was discharged out of the reactor and processed in a conventional manner by dehydrating and drying into a polyvinyl chloride resin powder as the product, which was evaluated in the procedures described above to give the results shown in Table 1 below.

Comparative Example 3

The procedure was substantially the same as in Example 4 described above with step-wise control of the power on the stirrer except that the first-step decrease of the stirrer power to 140 kg.m/s per 1000 kg of the polymerization mixture was undertaken at a moment when the monomer conversion was 15% instead of 10% in Example 4 and the reflux condenser was brought into operation immediately after this stirrer power decrease.

The results of evaluation of the thus obtained polyvinyl resin product are also shown in Table 1.

Comparative Example 4

The polymerization procedure was started substantially in the same manner as in Example 1 described above except that the monomer-soluble polymerization initiator was replaced with 8.4 kg of a 5% by weight aqueous solution of potassium persulfate. The polymerization reaction, however, proceeded only at a very low velocity so that the polymerization reaction was terminated after 10 hours when the monomer conversion was still only 8%. No evaluation tests of the resin product were undertaken.

Comparative Example 5

The procedure was substantially the same as in Example 1 described above with continuous decreasing control of the power on the stirrer except that the amount of the deionized water was decreased from 890 kg to 795 kg, the amount of the vinyl chloride monomer was increased from 700 kg to 795 kg, the amount of the aqueous solution of the same partially saponified polyvinyl alcohol was increased from 933 g to 1060 g and the amount of the aqueous solution of the monomer-soluble polymerization initiator was increased from 735 g to 835 g.

The results of evaluation of the thus obtained polyvinyl chloride resin product are also shown in Table 1.

TABLE 1

| | Example | | | |
|---|---|---|---|---|
| | 1 | 2 | 3 | 4 |
| Bulk density, g/cm³ | 0.560 | 0.561 | 0.565 | 0.562 |
| Particle size distribution, %, passing through | | | | |
| 60 mesh screen | 99.9 | 99.9 | 99.8 | 99.9 |
| 100 mesh screen | 45.6 | 61.2 | 25.1 | 41.6 |
| 200 mesh screen | 0.5 | 0.9 | 0.2 | 0.5 |
| Plasticizer absorption, % | 24.5 | 24.8 | 23.9 | 24.3 |
| Fish eyes, pieces | 1 | 0 | 1 | 1 |
| Residual monomer, ppm | 0.3 | 0.2 | 0.4 | 0.3 |
| Polymer scale deposition | A | A | A | A |

| | Comparative Example | | | |
|---|---|---|---|---|
| | 1 | 2 | 3 | 5 |
| Bulk density, g/cm³ | 0.512 | 0.501 | 0.541 | 0.519 |
| Particle size distribution, %, passing through | | | | |
| 60 mesh screen | 98.5 | 98.1 | 99.0 | 46.5 |
| 100 mesh screen | 58.9 | 19.8 | 53.2 | 6.4 |
| 200 mesh screen | 2.6 | 1.5 | 1.7 | 1.0 |
| Plasticizer absorption, % | 25.1 | 23.1 | 24.7 | 22.3 |
| Fish eyes, pieces | 6 | 10 | 6 | 15 |
| Residual monomer, ppm | 1.5 | 2.1 | 1.1 | 2.9 |
| Polymer scale deposition | B | C | B | C |

What is claimed is:

1. In a method for the suspension polymerization of vinyl chloride or a monomer mixture mainly composed of vinyl chloride in an aqueous medium containing a dispersing agent in the presence of a monomer-soluble polymerization initiator comprising the steps of introducing from 110 to 200 parts by weight of water and from 0.02 to 0.15 part by weight of a dispersing agent, which is a partially saponified polyvinyl alcohol having a degree of saponification of 60 to 80% and an average degree of polymerization of 500 to 1000 to give a 4% by weight aqueous solution having a viscosity not exceeding 15 centipoise at 20° C. and a 1% by weight aqueous solution having an absorbance of light of at least 4 at a wavelength of 280 nm for an optical path length of 1 cm, into a polymerization reactor equipped with a stirrer and a reflux condenser to form a polymerization medium, deaerating the polymerization medium by reducing the pressure, introducing 100 parts by weight of the vinyl chloride monomer or monomer mixture, introducing the polymerization initiator into the polymerization medium under agitation with the stirrer to form a polymerization mixture, increasing the temperature of the polymerization mixture to a polymerization temperature to start the polymerization reaction under continuous agitation of the polymerization mixture with the stirrer driven with a power sufficient to suspend the monomer droplets in the polymerization medium and continuing agitation of the polymerization mixture until the end of the polymerization reaction, the improvement which comprises:

(a) driving the stirrer with a power thereon in the range from 100 to 200 kgf.m/s per 1000 kg of the polymerization mixture at least until the start of the polymerization reaction;

(b) decreasing the power on the stirrer either stepwise or continuously during the period from the start of the polymerization reaction to the moment when conversion of the monomer or monomer mixture into polymer is 17% down to a value in the range from 96 to 84% of the value before the start of the polymerization reaction;

(c) bringing the reflux condenser into operation at a moment when conversion of the monomer or monomer mixture into polymer is in the range from 5 to 20%, after the moment when conversion of the monomer or monomer mixture into polymer is higher by at least 3% than the conversion at the moment when the power on the stirrer is decreased in step (b) and the power on the stirrer is in the range from 96 to 80% of the power before the start of the polymerization reaction; and (d) further decreasing the power on the stirrer either step-wise or continuously during the period from the start of the operation of the reflux condenser to the moment when the conversion of the monomer or monomer mixture is 30% by a decrement in the range from 4 to 20% based on the power at the start of the polymerization reaction so that the power on the stirrer is in the range from 90 to 60% based on the power before the start of the polymerization reaction.

* * * * *

UNITED STATES PATENT AND TRADEMARK OFFICE
CERTIFICATE OF CORRECTION

PATENT NO. : 5,342,906
DATED : August 30, 1994
INVENTOR(S) : Tadashi Amano, et al

It is certified that error appears in the above-indentified patent and that said Letters Patent is hereby corrected as shown below:

Title Page insert

[30] Foreign Application Priority Data

Apr. 9, 1991 [JP]    JAPAN .................. 3-10359

Signed and Sealed this

Fifteenth Day of November, 1994

Attest:

BRUCE LEHMAN

*Attesting Officer*    *Commissioner of Patents and Trademarks*